US012604316B2

(12) United States Patent
Zhang et al.

(10) Patent No.: US 12,604,316 B2
(45) Date of Patent: Apr. 14, 2026

(54) METHODS AND APPARATUS OF PDSCH PROCESSING PROCEDURE TIME DERIVATION FOR HARQ-ACK FEEDBACK OF PDSCH SCHEDULED BY ENHANCED PDCCH E

(71) Applicant: Lenovo (Beijing) Limited, Beijing (CN)

(72) Inventors: Yi Zhang, Beijing (CN); Chenxi Zhu, Beijing (CN); Bingchao Liu, Beijing (CN); Wei Ling, Beijing (CN); Lingling Xiao, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 328 days.

(21) Appl. No.: 18/290,168

(22) PCT Filed: May 10, 2021

(86) PCT No.: PCT/CN2021/092810
§ 371 (c)(1),
(2) Date: Nov. 10, 2023

(87) PCT Pub. No.: WO2022/236590
PCT Pub. Date: Nov. 17, 2022

(65) Prior Publication Data
US 2024/0267918 A1 Aug. 8, 2024

(51) Int. Cl.
*H04W 72/12* (2023.01)
*H04L 1/1812* (2023.01)
(Continued)

(52) U.S. Cl.
CPC ....... *H04W 72/1273* (2013.01); *H04L 1/1812* (2013.01); *H04W 72/232* (2023.01)

(58) Field of Classification Search
CPC ............ H04W 72/1273; H04W 72/232; H04L 1/1812; H04L 5/0055; H04L 5/0078; H04L 1/1854
See application file for complete search history.

(56) References Cited

U.S. PATENT DOCUMENTS 12,389,391 B2 * 8/2025 Ying ..................... H04L 1/1864
2019/0289622 A1 * 9/2019 Chatterjee ............. H04W 72/20
(Continued)

FOREIGN PATENT DOCUMENTS

| CN | 111066280 A | 4/2020 |
| CN | 112400291 A | 2/2021 |
| WO | 2019143982 A1 | 7/2019 |

OTHER PUBLICATIONS

Moderator (Qualcomm), "Summary #2 of email discussions [104b-e-NR-feMIMO-02] for mTRP PDCCH enhancements", 3GPP TSG-RAN WG1 Meeting #104-bis-e, R1-2103820, e-Meeting, Apr. 2021, 21 pages (Year: 2021).*
"Foreign Office Action", EP Application No. 21941166.7, Jun. 26, 2025, 4 pages.
"Extended European Search Report", EP Application No. 21941166.7, Nov. 29, 2024, 8 pages.
Huawei, et al., "Enhancements on multi-TRP for reliability and robustness in Rel-17", 3GPP TSG RAN WG1 Meeting #104bis-e, R1-2102334, E-meeting, Apr. 2021, 15 pages.
(Continued)

*Primary Examiner* — Lan-Huong Truong
(74) *Attorney, Agent, or Firm* — FIG. 1 Patents

(57) ABSTRACT

Methods and apparatus of Physical Downlink Shared Channel (PDSCH) processing procedure time derivation for Hybrid Automatic Repeat Request Acknowledgement (HARQ-ACK) feedback of PDSCH scheduled by enhanced Physical Downlink Control Channel (PDCCH) are disclosed. The method includes: receiving, by a receiver, a Physical Downlink Shared Channel (PDSCH) that is scheduled by a Physical Downlink Control Channel (PDCCH) transmitted with a plurality of repetitions, wherein the plurality of repetitions including a first PDCCH and a second PDCCH; deriving, by a processor, a PDSCH processing procedure time based on: a first number of overlapping symbols between the first PDCCH and the PDSCH, a
(Continued)

---

702
receiving, by a receiver, a Physical Downlink Shared Channel (PDSCH) that is scheduled by a Physical Downlink Control Channel (PDCCH) transmitted with a plurality of repetitions, wherein the plurality of repetitions including a first PDCCH and a second PDCCH 704
deriving, by a processor, a PDSCH processing procedure time based on:
a first number of overlapping symbols between the first PDCCH and the PDSCH,
a second number of overlapping symbols between the second PDCCH and the PDSCH, and/or
an additional processing time for processing of the PDCCH transmitted with a plurality of repetitions 706
transmitting, by a transmitter, a valid HARQ-ACK message no earlier than the PDSCH processing procedure time second number of overlapping symbols between the second PDCCH and the PDSCH, and/or an additional processing time for processing of the PDCCH transmitted with a plurality of repetitions; and transmitting, by a transmitter, a valid Hybrid Automatic Repeat Request Acknowledgement (HARQ-ACK) message no earlier than the PDSCH processing procedure time.

20 Claims, 6 Drawing Sheets

(51) Int. Cl.
    *H04W 72/1273*     (2023.01)
    *H04W 72/232*     (2023.01)

(56)                 References Cited

U.S. PATENT DOCUMENTS

| | | | | |
|---|---|---|---|---|
| 2022/0416953 | A1* | 12/2022 | Li | H04L 1/1861 |
| 2024/0008024 | A1* | 1/2024 | Jung | H04L 1/1812 |
| 2024/0214947 | A1* | 6/2024 | Park | H04L 5/0053 |

OTHER PUBLICATIONS

Moderator (Qualcomm), "Summary #2 of email discussions [104b-e-NR-feMIMO-02] for mTRP PDCCH enhancements", 3GPP TSG-RAN WG1 Meeting #104-bis-e, R1-2103820, e-Meeting, Apr. 2021, 21 pages.

VIVO, "Enhancements on Multi-TRP for PDCCH, PUCCH and PUSCH", 3GPP TSG RAN WG1 #104b-e, R1-2102507, e-Meeting, Apr. 2021, 28 pages.

PCT/CN2021/092810 , "International Preliminary Report on Patentability", PCT Application No. PCT/CN2021/092810, Nov. 23, 2023, 5 pages.

PCT/CN2021/092810 , "International Search Report and Written Opinion", PCT Application No. PCT/CN2021/092810, Feb. 10, 2022, 6 pages.

Qualcomm Incorporated , "Enhancements on Multi-TRP for PDCCH, PUCCH and PUSCH", 3GPP TSG-RAN WG1 Meeting #104-bis-e, R1-2103151, e-Meeting [retrieved Dec. 19, 2023]. Retrieved from the Internet <https://www.3gpp.org/ftp/TSG_RAN/WG1_RL1/TSGR1_104b-e/Docs/>, Apr. 2021, 33 pages.

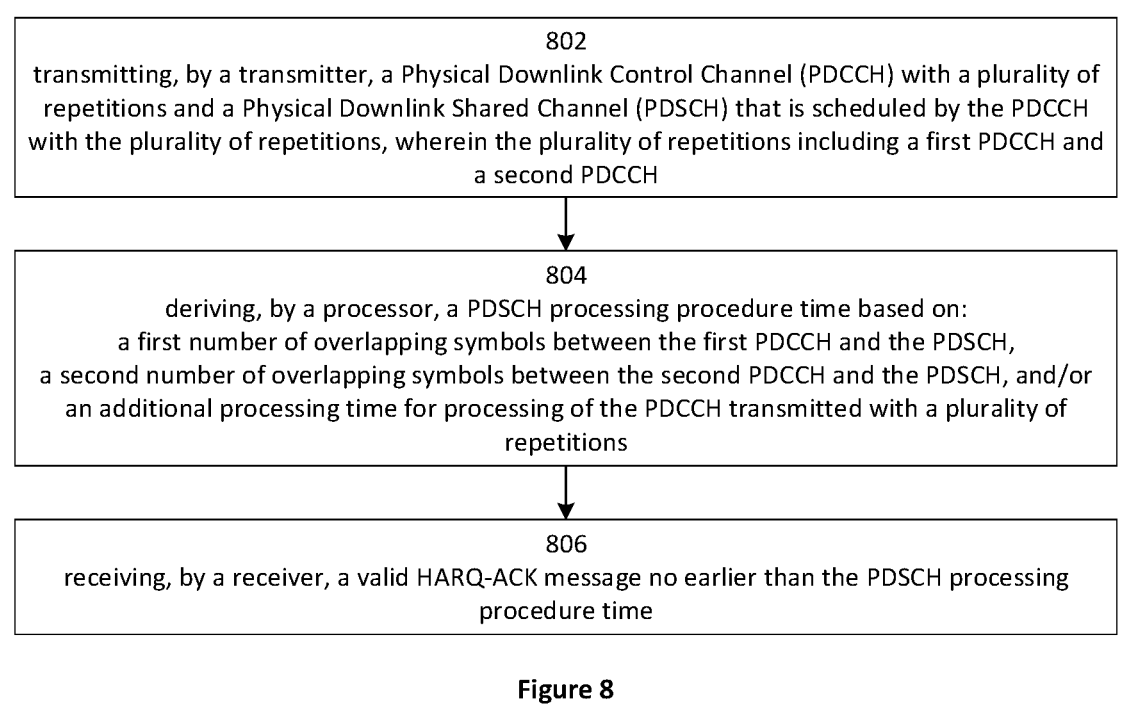

* cited by examiner 802
transmitting, by a transmitter, a Physical Downlink Control Channel (PDCCH) with a plurality of repetitions and a Physical Downlink Shared Channel (PDSCH) that is scheduled by the PDCCH with the plurality of repetitions, wherein the plurality of repetitions including a first PDCCH and a second PDCCH 804
deriving, by a processor, a PDSCH processing procedure time based on:
a first number of overlapping symbols between the first PDCCH and the PDSCH,
a second number of overlapping symbols between the second PDCCH and the PDSCH, and/or
an additional processing time for processing of the PDCCH transmitted with a plurality of repetitions 806
receiving, by a receiver, a valid HARQ-ACK message no earlier than the PDSCH processing procedure time

Figure 8

METHODS AND APPARATUS OF PDSCH PROCESSING PROCEDURE TIME DERIVATION FOR HARQ-ACK FEEDBACK OF PDSCH SCHEDULED BY ENHANCED PDCCH E

FIELD

The subject matter disclosed herein relates generally to wireless communication and more particularly relates to, but not limited to, methods and apparatus of Physical Downlink Shared Channel (PDSCH) processing procedure time derivation for Hybrid Automatic Repeat Request Acknowledgement (HARQ-ACK) feedback of PDSCH scheduled by enhanced Physical Downlink Control Channel (PDCCH).

BACKGROUND

The following abbreviations and acronyms are herewith defined, at least some of which are referred to within the specification:

Third Generation Partnership Project (3GPP), 5th Generation (5G), New Radio (NR), 5G Node B (gNB), Long Term Evolution (LTE), LTE Advanced (LTE-A), E-UTRAN Node B (eNB), Universal Mobile Telecommunications System (UMTS), Worldwide Interoperability for Microwave Access (WiMAX), Evolved UMTS Terrestrial Radio Access Network (E-UTRAN), Wireless Local Area Networking (WLAN), Orthogonal Frequency Division Multiplexing (OFDM), Single-Carrier Frequency-Division Multiple Access (SC-FDMA), Downlink (DL), Uplink (UL), User Entity/Equipment (UE), Network Equipment (NE), Radio Access Technology (RAT), Receive or Receiver (RX), Transmit or Transmitter (TX), Hybrid Automatic Repeat Request (HARQ), Acknowledgement (ACK), Hybrid Automatic Repeat Request Acknowledgement (HARQ-ACK), Physical Downlink Control Channel (PDCCH), Physical Downlink Shared Channel (PDSCH), Physical Uplink Control Channel (PUCCH), Physical Uplink Shared Channel (PUSCH), Enhanced Physical Downlink Control Channel (ePDCCH), Control Channel Element (CCE), Control Resource Set (CORESET), Cyclic Prefix (CP), Cyclic redundancy check (CRC), Cycling Shift (CS), Downlink Control Information (DCI), Frequency-Division Multiplexing (FDM), Frequency Division Multiple Access (FDMA), Identifier (ID), Modulation Coding Scheme (MCS), Resource Block (RB), Radio Network Temporary Identifier (RNTI), Reference Signal (RS), Redundancy Version (RV), Subcarrier Spacing (SCS), Start and Length Indicator (SLIV), Transport Block (TB), Time-Division Multiplexing (TDM), Time Domain Resource Allocation (TDRA), Transmission and Reception Point (TRP), Cell Radio Network Temporary Identifier (C-RNTI), Configured Scheduling RNTI (CS-RNTI), Fast Fourier Transform (FFT), Frequency Range 1 (FR1), Frequency Range 2 (FR2), Low-Density Parity Check (LDPC), Technical Specification (TS), Demodulation Reference Signal (DM-RS), Log Likelihood Ratio (LLR), Blind Detection (BD).

In wireless communication, such as a Third Generation Partnership Project (3GPP) mobile network, a wireless mobile network may provide a seamless wireless communication service to a wireless communication terminal having mobility, i.e., user equipment (UE). The wireless mobile network may be formed of a plurality of base stations and a base station may perform wireless communication with the UEs.

The 5G New Radio (NR) is the latest in the series of 3GPP standards which supports very high data rate with lower latency compared to its predecessor LTE (4G) technology. Two types of frequency range (FR) are defined in 3GPP. Frequency of sub-6 GHz range (from 450 to 6000 MHz) is called FR1 and millimeter wave range (from 24.25 GHz to 52.6 GHZ) is called FR2. The 5G NR supports both FR1 and FR2 frequency bands.

Enhancements on multi-TRP/panel transmission including improved reliability and robustness with both ideal and non-ideal backhaul between these TRPs (Transmit Receive Points) are studied. A TRP is an apparatus to transmit and receive signals, and is controlled by a gNB through the backhaul between the gNB and the TRP. A TRP may also be referred to as a transmitting-receiving identity, or simply an identity.

In current NR system, Physical Downlink Control Channel (PDCCH) is transmitted from a single TRP. With multiple TRPs, time-frequency resources for PDCCH transmission may be from multiple TRPs. The spatial diversity may be exploited in addition to the time-frequency diversity. Enhanced Physical Downlink Control Channel (ePDCCH) can be transmitted with multiple repetition from multiple TRPs to improve PDCCH transmission reliability and robustness. Multiple transmissions of the ePDCCH may be transmitted from a same TRP or some different TRPs.

SUMMARY

Methods and apparatus of PDSCH processing procedure time derivation for HARQ-ACK feedback of PDSCH scheduled by enhanced PDCCH are disclosed.

According to a first aspect, there is provided a method, including: receiving, by a receiver, a Physical Downlink Shared Channel (PDSCH) that is scheduled by a Physical Downlink Control Channel (PDCCH) transmitted with a plurality of repetitions, wherein the plurality of repetitions including a first PDCCH and a second PDCCH; deriving, by a processor, a PDSCH processing procedure time based on: a first number of overlapping symbols between the first PDCCH and the PDSCH, a second number of overlapping symbols between the second PDCCH and the PDSCH, and/or an additional processing time for processing of the PDCCH transmitted with a plurality of repetitions; and transmitting, by a transmitter, a valid Hybrid Automatic Repeat Request Acknowledgement (HARQ-ACK) message no earlier than the PDSCH processing procedure time.

According to a second aspect, there is provided a method, including: transmitting, by a transmitter, a Physical Downlink Control Channel (PDCCH) with a plurality of repetitions and a Physical Downlink Shared Channel (PDSCH) that is scheduled by the PDCCH with the plurality of repetitions, wherein the plurality of repetitions including a first PDCCH and a second PDCCH; deriving, by a processor, a PDSCH processing procedure time based on: a first number of overlapping symbols between the first PDCCH and the PDSCH, a second number of overlapping symbols between the second PDCCH and the PDSCH, and/or an additional processing time for processing of the PDCCH transmitted with a plurality of repetitions; and receiving, by a receiver, a valid Hybrid Automatic Repeat Request Acknowledgement (HARQ-ACK) message no earlier than the PDSCH processing procedure time.

According to a third aspect, there is provided an apparatus, including: a receiver that receives a Physical Downlink Shared Channel (PDSCH) that is scheduled by a Physical Downlink Control Channel (PDCCH) transmitted with a plurality of repetitions, wherein the plurality of repetitions including a first PDCCH and a second PDCCH; a processor that derives a PDSCH processing procedure time based on: a first number of overlapping symbols between the first PDCCH and the PDSCH, a second number of overlapping symbols between the second PDCCH and the PDSCH, and/or an additional processing time for processing of the PDCCH transmitted with a plurality of repetitions; and a transmitter that transmits a valid Hybrid Automatic Repeat Request Acknowledgement (HARQ-ACK) message no earlier than the PDSCH processing procedure time.

According to a fourth aspect, there is provided an apparatus, including: a transmitter that transmits a Physical Downlink Control Channel (PDCCH) with a plurality of repetitions and a Physical Downlink Shared Channel (PDSCH) that is scheduled by the PDCCH with the plurality of repetitions, wherein the plurality of repetitions including a first PDCCH and a second PDCCH; a processor that derives a PDSCH processing procedure time based on: a first number of overlapping symbols between the first PDCCH and the PDSCH, a second number of overlapping symbols between the second PDCCH and the PDSCH, and/or an additional processing time for processing of the PDCCH transmitted with a plurality of repetitions; and a receiver that receives a valid Hybrid Automatic Repeat Request Acknowledgement (HARQ-ACK) message no earlier than the PDSCH processing procedure time.

BRIEF DESCRIPTION OF THE DRAWINGS

A more particular description of the embodiments will be rendered by reference to specific embodiments illustrated in the appended drawings. Given that these drawings depict only some embodiments and are not therefore considered to be limiting in scope, the embodiments will be described and explained with additional specificity and details through the use of the accompanying drawings, in which:

FIG. 8 is a flow chart illustrating steps of PDSCH processing procedure time derivation for HARQ-ACK feedback of PDSCH scheduled by enhanced PDCCH by gNB or NE in accordance with some implementations of the present disclosure.

DETAILED DESCRIPTION

Figure 1:
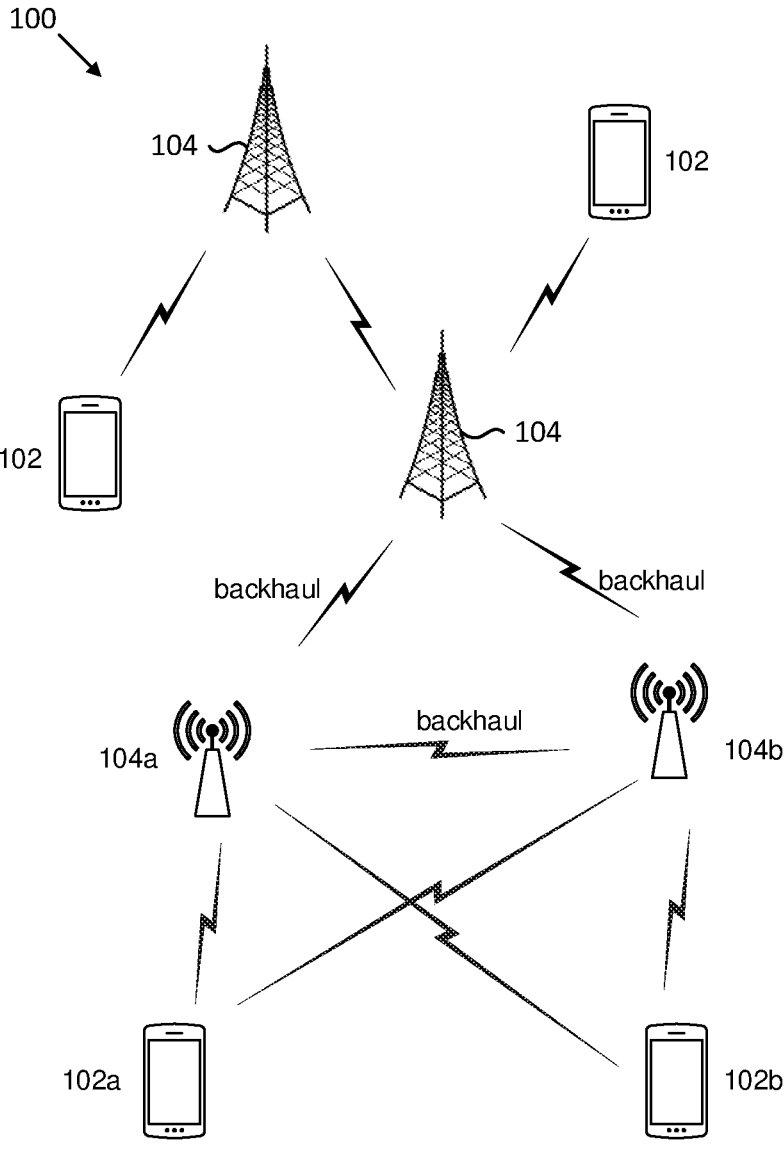
FIG. 1 is a schematic diagram illustrating a wireless communication system in accordance with some implementations of the present disclosure.

As will be appreciated by one skilled in the art, aspects of the embodiments may be embodied as a system, an apparatus, a method, or a program product. Accordingly, embodiments may take the form of an all-hardware embodiment, an all-software embodiment (including firmware, resident software, micro-code, etc.) or an embodiment combining software and hardware aspects.

Furthermore, one or more embodiments may take the form of a program product embodied in one or more computer readable storage devices storing machine readable code, computer readable code, and/or program code, referred to hereafter as "code." The storage devices may be tangible, non-transitory, and/or non-transmission.

Reference throughout this specification to "one embodiment," "an embodiment," "an example," "some embodiments," "some examples," or similar language means that a particular feature, structure, or characteristic described is included in at least one embodiment or example. Thus, instances of the phrases "in one embodiment," "in an example," "in some embodiments," and similar language throughout this specification may, but do not necessarily, all refer to the same embodiment(s). It may or may not include all the embodiments disclosed. Features, structures, elements, or characteristics described in connection with one or some embodiments are also applicable to other embodiments, unless expressly specified otherwise. The terms "including," "comprising," "having," and variations thereof mean "including but not limited to," unless expressly specified otherwise.

An enumerated listing of items does not imply that any or all of the items are mutually exclusive, unless expressly specified otherwise. The terms "a," "an," and "the" also refer to "one or more" unless expressly specified otherwise.

Throughout the disclosure, the terms "first," "second," "third," and etc. are all used as nomenclature only for references to relevant devices, components, procedural steps, and etc. without implying any spatial or chronological orders, unless expressly specified otherwise. For example, a "first device" and a "second device" may refer to two separately formed devices, or two parts or components of the same device. In some cases, for example, a "first device" and a "second device" may be identical, and may be named arbitrarily. Similarly, a "first step" of a method or process may be carried or performed after, or simultaneously with, a "second step."

It should be understood that the term "and/or" as used herein refers to and includes any and all possible combinations of one or more of the associated listed items. For example, "A and/or B" may refer to any one of the following three combinations: existence of A only, existence of B only, and co-existence of both A and B. The character "/" generally indicates an "or" relationship of the associated items. This, however, may also include an "and" relationship of the associated items. For example, "A/B" means "A or B," which may also include the co-existence of both A and B, unless the context indicates otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, as well as combinations of blocks in the schematic flowchart diagrams and/or schematic block diagrams, may be implemented by code. This code may be provided to a processor of a general-purpose computer, special purpose computer, or other programmable data processing apparatus to produce a machine, such that the instructions executed via the processor of the computer or other programmable data processing apparatus create a means for implementing the functions or acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function or act specified in the schematic flowchart diagrams and/or schematic block diagrams.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). One skilled in the relevant art will recognize, however, that the flowchart diagrams need not necessarily be practiced in the sequence shown and are able to be practiced without one or more of the specific steps, or with other steps not shown.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved.

FIG. 1 is a schematic diagram illustrating a wireless communication system. It depicts an embodiment of a wireless communication system 100. In one embodiment, the wireless communication system 100 may include a user equipment (UE) 102 and a network equipment (NE) 104. Even though a specific number of UEs 102 and NEs 104 is depicted in FIG. 1, one skilled in the art will recognize that any number of UEs 102 and NEs 104 may be included in the wireless communication system 100.

The UEs 102 may be referred to as remote devices, remote units, subscriber units, mobiles, mobile stations, users, terminals, mobile terminals, fixed terminals, subscriber stations, user terminals, apparatus, devices, or by other terminology used in the art.

In one embodiment, the UEs 102 may be autonomous sensor devices, alarm devices, actuator devices, remote control devices, or the like. In some other embodiments, the UEs 102 may include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the UEs 102 include wearable devices, such as smart watches, fitness bands, optical head-mounted displays, or the like. The UEs 102 may communicate directly with one or more of the NEs 104.

The NE 104 may also be referred to as a base station, an access point, an access terminal, a base, a Node-B, an eNB, a gNB, a Home Node-B, a relay node, an apparatus, a device, or by any other terminology used in the art. Throughout this specification, a reference to a base station may refer to any one of the above referenced types of the network equipment 104, such as the eNB and the gNB.

The NEs 104 may be distributed over a geographic region. The NE 104 is generally part of a radio access network that includes one or more controllers communicably coupled to one or more corresponding NEs 104. The radio access network is generally communicably coupled to one or more core networks, which may be coupled to other networks, like the Internet and public switched telephone networks. These and other elements of radio access and core networks are not illustrated, but are well known generally by those having ordinary skill in the art.

In one implementation, the wireless communication system 100 is compliant with a 3GPP 5G new radio (NR). In some implementations, the wireless communication system 100 is compliant with a 3GPP protocol, where the NEs 104 transmit using an OFDM modulation scheme on the DL and the UEs 102 transmit on the uplink (UL) using a SC-FDMA scheme or an OFDM scheme. More generally, however, the wireless communication system 100 may implement some other open or proprietary communication protocols, for example, WiMAX. The present disclosure is not intended to be limited to the implementation of any particular wireless communication system architecture or protocol.

The NE 104 may serve a number of UEs 102 within a serving area, for example, a cell (or a cell sector) or more cells via a wireless communication link. The NE 104 transmits DL communication signals to serve the UEs 102 in the time, frequency, and/or spatial domain.

Communication links are provided between the NE 104 and the UEs 102a, 102b, 102c, and 102d, which may be NR UL or DL communication links, for example. Some UEs 102 may simultaneously communicate with different Radio Access Technologies (RATs), such as NR and LTE. Direct or indirect communication link between two or more NEs 104 may be provided.

The NE 104 may also include one or more transmit receive points (TRPs) 104a. In some embodiments, the network equipment may be a gNB 104 that controls a number of TRPs 104a. In addition, there is a backhaul between two TRPs 104a. In some other embodiments, the network equipment may be a TRP 104a that is controlled by a gNB.

Communication links are provided between the NEs 104, 104a and the UEs 102, 102a, respectively, which, for example, may be NR UL/DL communication links. Some UEs 102, 102a may simultaneously communicate with different Radio Access Technologies (RATs), such as NR and LTE.

In some embodiments, the UE 102a may be able to communicate with two or more TRPs 104a that utilize a non-ideal backhaul, simultaneously. A TRP may be a transmission point of a gNB. Multiple beams may be used by the UE and/or TRP(s). The two or more TRPs may be TRPs of different gNBs, or a same gNB. That is, different TRPs may have the same Cell-ID or different Cell-IDs. The terms "TRP" and "transmitting-receiving identity" may be used interchangeably throughout the disclosure.

The technology disclosed, or at least some of the examples, may be applicable to scenarios with multiple TRPs or without multiple TRPs, as long as multiple PDCCH transmissions are supported.

Figure 2:
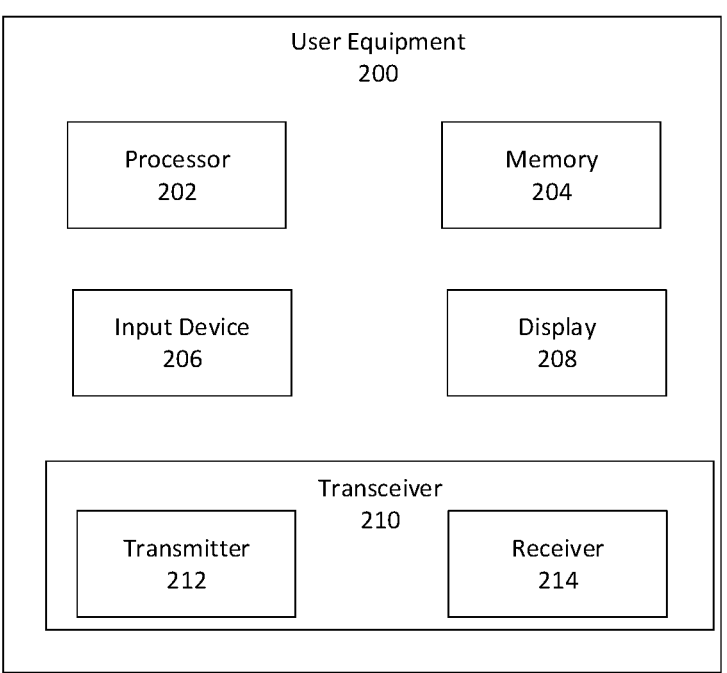
FIG. 2 is a schematic block diagram illustrating components of user equipment (UE) in accordance with some implementations of the present disclosure.

FIG. 2 is a schematic block diagram illustrating components of user equipment (UE) according to one embodiment. A UE 200 may include a processor 202, a memory 204, an input device 206, a display 208, and a transceiver 210. In some embodiments, the input device 206 and the display 208 are combined into a single device, such as a touchscreen. In certain embodiments, the UE 200 may not include any input device 206 and/or display 208. In various embodiments, the UE 200 may include one or more processors 202 and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit (CPU), a graphics processing unit (GPU), an auxiliary processing unit, a field programmable gate array (FPGA), or similar programmable controller. In some embodiments, the processor 202 executes instructions stored in the memory 204 to perform the methods and routines described herein. The processor 202 is communicatively coupled to the memory 204 and the transceiver 210.

The memory 204, in one embodiment, is a computer readable storage medium. In some embodiments, the memory 204 includes volatile computer storage media. For example, the memory 204 may include a RAM, including dynamic RAM (DRAM), synchronous dynamic RAM (SDRAM), and/or static RAM (SRAM). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to trigger conditions for transmitting the measurement report to the network equipment. In some embodiments, the memory 204 also stores program code and related data.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display.

The display 208, in one embodiment, may include any known electronically controllable display or display device. The display 208 may be designed to output visual, audio, and/or haptic signals.

The transceiver 210, in one embodiment, is configured to communicate wirelessly with the network equipment. In certain embodiments, the transceiver 210 comprises a transmitter 212 and a receiver 214. The transmitter 212 is used to transmit UL communication signals to the network equipment and the receiver 214 is used to receive DL communication signals from the network equipment.

The transmitter 212 and the receiver 214 may be any suitable type of transmitters and receivers. Although only one transmitter 212 and one receiver 214 are illustrated, the transceiver 210 may have any suitable number of transmitters 212 and receivers 214. For example, in some embodiments, the UE 200 includes a plurality of the transmitter 212 and the receiver 214 pairs for communicating on a plurality of wireless networks and/or radio frequency bands, with each of the transmitter 212 and the receiver 214 pairs configured to communicate on a different wireless network and/or radio frequency band.

Figure 3:
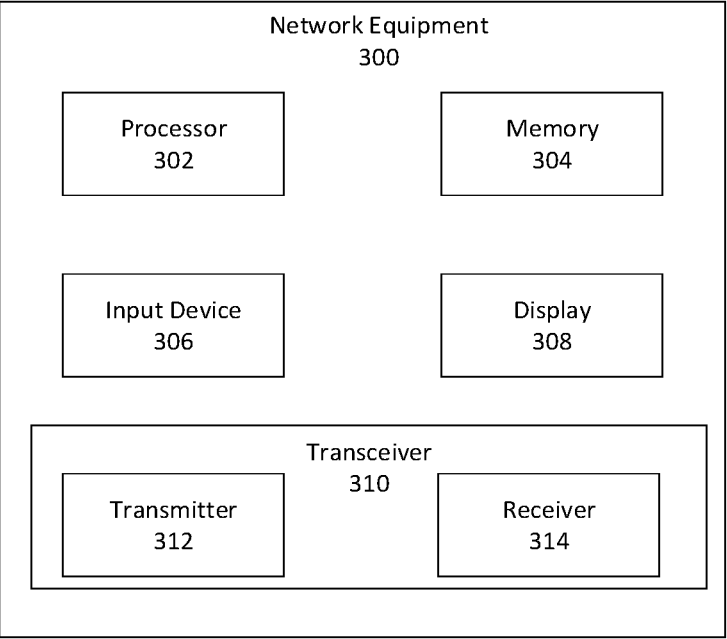
FIG. 3 is a schematic block diagram illustrating components of network equipment (NE) in accordance with some implementations of the present disclosure.

FIG. 3 is a schematic block diagram illustrating components of network equipment (NE) 300 according to one embodiment. The NE 300 may include a processor 302, a memory 304, an input device 306, a display 308, and a transceiver 310. As may be appreciated, the processor 302, the memory 304, the input device 306, the display 308, and the transceiver 310 may be similar to the processor 202, the memory 204, the input device 206, the display 208, and the transceiver 210 of the UE 200, respectively.

In some embodiments, the processor 302 controls the transceiver 310 to transmit DL signals or data to the UE 200. The processor 302 may also control the transceiver 310 to receive UL signals or data from the UE 200. In another example, the processor 302 may control the transceiver 310 to transmit DL signals containing various configuration data to the UE 200.

In some embodiments, the transceiver 310 comprises a transmitter 312 and a receiver 314. The transmitter 312 is used to transmit DL communication signals to the UE 200 and the receiver 314 is used to receive UL communication signals from the UE 200.

The transceiver 310 may communicate simultaneously with a plurality of UEs 200. For example, the transmitter 312 may transmit DL communication signals to the UE 200. As another example, the receiver 314 may simultaneously receive UL communication signals from the UE 200. The transmitter 312 and the receiver 314 may be any suitable type of transmitters and receivers. Although only one transmitter 312 and one receiver 314 are illustrated, the transceiver 310 may have any suitable number of transmitters 312 and receivers 314. For example, the NE 300 may serve multiple cells and/or cell sectors, where the transceiver 310 includes a transmitter 312 and a receiver 314 for each cell or cell sector.

In current 3GPP specification, if a PDSCH with mapping Type B is scheduled by a DCI in PDCCH candidates that are linked for repetition, for the purpose of the earliest time that the PDSCH can be scheduled as well as for the purpose of the reference symbol for SLIV (when UE is configured with ReferenceofSLIV-ForDCIFormat1_2, and when receiving the PDSCH scheduled by DCI format 1_2 with CRC scrambled by C-RNTI, MCS-C-RNTI, CS-RNTI with K0-0), a reference candidate is used. One among the following may be selected:

Alt1: The candidate that starts later in time;

Alt3: The candidate that starts earlier in time.

PDSCH processing procedure time is related to, and thus may be derived based on:

basic processing time $N_1$ with definition based on numerology and UE processing capability 1 and 2, additional time $d_{1,1}$ to catch up with the delay to meet the existing basic processing time requirements, and additional time $d_2$ for PUCCH of a larger priority set as reported by UE in case of PUCCH of a larger index overlapping with PUCCH/PUSCH of a smaller priority index.

For $d_{1,1}$, it is defined based on PDSCH symbol length and overlapping symbol number of the scheduling PDCCH and the scheduled PDSCH. For ePDCCH, two linked search space sets are configured and two candidates from the linked search space sets are used for one PDCCH detection together. Thus, the overlapping between ePDCCH and PDSCH may happen for both linked PDCCHs.

Accordingly, the effective or actual overlapping symbol number should be clarified for case of ePDCCH scheduling. Furthermore, blind detection number corresponding to two PDCCH candidates may be 2 or 3, whereas only 1 time of blind detection is used for normal PDCCH under Release 15 or 16.

Further, non-overlapping CCE number may be increased on account of multiple CORESET configurations for PDCCH with repetition transmission. This may result in the increase of ePDCCH decoding time.

PDSCH processing procedure time $T_{proc,1}$ is specified in section 5.3 of Technical Specification (TS) 38.214, where it is related to basic processing time $N_1$ and additional time $d_{1,1}$ relative to basic processing time for the case of smaller PDSCH symbol length and time overlapping between scheduling PDCCH and scheduled PDSCH and additional time $d_2$ for Physical Uplink Control Channel (PUCCH) of a larger priority set as reported by UE in the case of PUCCH of a larger index overlapping with PUCCH/PUSCH of a smaller priority index. Here, basic processing time $N_1$ is defined based on at least 7 PDSCH symbol. For $d_{1,1}$, it is defined based on the PDSCH symbol length and the overlapping symbol number (i.e., the number of overlapping symbols) between the scheduling PDCCH and the scheduled PDSCH. The time of PDSCH receiving (i.e., the time for receiving PDSCH) after PDCCH receiving can be used for PDCCH blind detection. The detailed information is as follows:

If the first uplink symbol of the PUCCH which carries the HARQ-ACK information, as defined by the assigned HARQ-ACK timing $K_1$ and the PUCCH resource to be used and including the effect of the timing advance, starts no earlier than at symbol $L_1$, where $L_1$ is defined as the next uplink symbol with its CP starting after $T_{proc,1} = (N_1 + d_{1,1} + d_2)(2048 + 14) \cdot \kappa 2^{-\mu} \cdot T_c + T_{ext}$ after the end of the last symbol of the PDSCH carrying the TB being acknowledged, then the UE shall provide a valid HARQ-ACK message.

$N_1$ is based on u of table 5.3-1 and table 5.3-2 for UE processing capability 1 and 2 respectively, where u corresponds to the one of ($\mu_{PDCCH}$, $\mu_{PDSCH}$, $\mu_{UL}$) resulting with the largest $T_{proc,1}$, where the $\mu_{PDCCH}$ corresponds to the subcarrier spacing of the PDCCH scheduling the PDSCH, the $\mu_{PDSCH}$ corresponds to the subcarrier spacing of the scheduled PDSCH, and $\mu_{UL}$ corresponds to the subcarrier spacing of the uplink channel with which the HARQ-ACK is to be transmitted, and $\kappa$ is defined in clause 4.1 of [4, TS 38.211].

For operation with shared spectrum channel access, $T_{ext}$ is calculated according to [4, TS 38.211], otherwise $T_{ext}=0$.

If the PDSCH DM-RS position $l_1$ for the additional DM-RS in Table 7.4.1.1.2-3 in clause 7.4.1.1.2 of [4, TS 38.211] is (1=12 then $N_{1,0}=14$ in Table 5.3-1, otherwise $N_{1,0}=13$.

If the UE is configured with multiple active component carriers, the first uplink symbol which carries the HARQ-ACK information further includes the effect of timing difference between the component carriers as given in [11, TS 38.133].

For the PDSCH mapping type A as given in clause 7.4.1.1 of [4, TS 38.211]: if the last symbol of PDSCH is on the i-th symbol of the slot where i<7, then $d_{1,1}=7-i$, otherwise $d_{1,1}=0$ If a PUCCH of a larger priority index would overlap with PUCCH PUSCH of a smaller priority index, $d_2$ for the PUCCH of a larger priority is set as reported by the UE; otherwise $d_2=0$.

For UE processing capability 1: If the PDSCH is mapping type B as given in clause 7.4.1.1 of [4, TS 38.211], and if the number of PDSCH symbols allocated is L≥7, then $d_{1,1}=0$, if the number of PDSCH symbols allocated is L≥4 and L≤6, then $d_{1,1}=7-L$.

if the number of PDSCH symbols allocated is L=3 then $d_{1,1}=3+min$ (d,1), where d is the number of overlapping symbols of the scheduling PDCCH and the scheduled PDSCH.

if the number of PDSCH symbols allocated is 2, then $d_{1,1}=3+d$, where d is the number of overlapping symbols of the scheduling PDCCH and the scheduled PDSCH.

For UE processing capability 2: If the PDSCH is mapping type B as given in clause 7.4.1.1 of [4, TS 38.211], if the number of PDSCH symbols allocated is L≥7, then $d_{1,1}=0$, if the number of PDSCH symbols allocated is L≥3 and L≤6, then $d_{1,1}$ is the number of overlapping symbols of the scheduling PDCCH and the scheduled PDSCH, if the number of PDSCH symbols allocated is 2, if the scheduling PDCCH was in a 3-symbol CORESET and the CORESET and the PDSCH had the same starting symbol, then $d_{1,1}=3$, otherwise $d_{1,1}$ is the number of overlapping symbols of the scheduling PDCCH and the scheduled PDSCH.

For UE processing capability 2 with scheduling limitation when $\mu_{PDSCH}=1$, if the scheduled RB allocation exceeds 136 RBs, the UE defaults to capability 1 processing time. The UE may skip decoding a number of PDSCHs with last symbol within 10 symbols before the start of a PDSCH that is scheduled to follow Capability 2, if any of those PDSCHs are scheduled with more than 136 RBs with 30 kHz SCS and following Capability 1 processing time.

For a UE that supports capability 2 on a given cell, the processing time according to UE processing capability 2 is applied if the high layer parameter processingType2Enabled in PDSCH-ServingCell-Config is configured for the cell and set to enable.

If this PUCCH resource is overlapping with another PUCCH or PUSCH resource, then HARQ-ACK is multiplexed following the procedure in clause 9.2.5 of [6, TS 38.213], otherwise the HARQ-ACK message is transmitted on PUCCH.

Otherwise the UE may not provide a valid HARQ-ACK corresponding to the scheduled PDSCH. The value of $T_{proc,1}$ is used both in the case of normal and extended cyclic prefix.

For example, the table below illustrates PDSCH processing time for PDSCH processing capability 1:

| | PDSCH decoding time $N_1$ [symbols] | |
|---|---|---|
| $\mu$ | dmrs-AdditionalPosition = pos0 in DMRS-DownlinkConfig in both of dmrs-DownlinkForPDSCH-MappingTypeA, dmrs-DownlinkForPDSCH-MappingTypeB | dmrs-AdditionalPosition ≠ pos0 in DMRS-DownlinkConfig in either of dmrs-DownlinkForPDSCH-MappingTypeA, dmrs-DownlinkForPDSCH-MappingTypeB or if the higher layer parameter is not configured |
| 0 | 8 | $N_{1,0}$ |
| 1 | 10 | 13 |
| 2 | 17 | 20 |
| 3 | 20 | 24 |

The table below illustrates PDSCH processing time for PDSCH processing capability 2:

| | PDSCH decoding time $N_1$ [symbols] dmrs-AdditionalPosition = pos0 in DMRS-DownlinkConfig in both of dmrs-DownlinkForPDSCH-MappingTypeA, dmrs-DownlinkForPDSCH-MappingTypeB |
|---|---|
| $\mu$ | |
| 0 | 3 |
| 1 | 4.5 |
| 2 | 9 for frequency range 1 |

Thus, for normal PDCCH, $d_{1,1}$ is determined based on scheduled PDSCH symbols and overlapping symbols between scheduling PDCCH and scheduled PDSCH.

For ePDCCH in which one DCI may be transmitted with multiple candidates with repetitions from multiple TRPs, two linked search space sets are configured and two candidates from the linked search space sets are used for one PDCCH detection together. The overlapping between ePDCCH and the scheduled PDSCH may occur for both linked PDCCHs. Thus, the overlapping symbol number between ePDCCH and the scheduled PDSCH has to be specified in the case of ePDCCH scheduling.

In the disclosure, PDSCH processing procedure time for HARQ-ACK feedback, especially definition for $d_{1,1}$, is discussed for the case where PDSCH is scheduled by multiple PDCCHs with repetition. The multiple PDCCHs may possibly overlap with the scheduled PDSCH in the time domain. For various overlapping cases in the time domain, there may be different understanding on the overlapping symbol number between ePDCCH and PDSCH, i.e. the number of overlapping symbols between the PDCCH and PDSCH. Thus, clear definition for $d_{1,1}$ is required to meet processing time requirement for HARQ-ACK feedback.

Furthermore, the ePDCCH processing time may be increased and is taken into consideration in defining the PDSCH processing procedure time.

In the disclosure, PDSCH processing procedure time for PDSCH scheduled by ePDCCH with repetition is defined on account of the overlapping symbol number between PDSCH and PDCCH with repetition and/or the potential increase in the ePDCCH processing time. PDSCH processing procedure time is defined individually for cases without or with an increase in the PDCCH processing time.

In the disclosure, the derivation process of PDSCH processing procedure time is modified from the current specification TS38.214. In some examples, the value of d, which was the number of overlapping symbols of the scheduling PDCCH and the scheduled PDSCH, is re-defined for ePDCCH for calculation of $d_{1,1}$, which in turn is used for derivation of PDSCH processing procedure time $T_{proc,1}$. The modified PDSCH processing procedure time derivation process includes a method of deriving $d_{1,1}$, which may in turn be based on: a first number of overlapping symbols between the first PDCCH and the PDSCH, a second number of overlapping symbols between the second PDCCH and the PDSCH, and/or an additional processing time for processing of the PDCCH transmitted with a plurality of repetitions.

PDSCH Processing Procedure Time without Increasing ePDCCH Processing Time

In Release 15, the PDSCH processing procedure time is defined for UE to make blind detection (BD) of PDCCH before decoding PDSCH scheduled by the PDCCH. The PDCCH processing time includes times for FFT/Demodulation, channel estimation and Polar decoding. After obtaining information from PDCCH which includes information on DM-RS antenna port, TDRA, MCS, RV, etc., UE can perform DM-RS based channel estimation and LDPC decoding. During the interval for receiving the scheduled PDSCH, the UE can make PDCCH blind detection after receiving PDCCH. When there is overlapping between the PDCCH and PDSCH in the time domain in the case of fewer scheduled PDSCH symbols, the overlapping time is used for PDCCH receiving, and thus an additional time is introduced to compensate the time loss for PDSCH processing time, as previously described.

In some examples, it may be assumed that ePDCCH processing time is not increased compared with PDCCH processing time defined in Release 15 or Release 16, which can be realized by limiting the BD counting number and non-overlapping CCE number. Based on this assumption, the PDSCH processing procedure time for PDSCH scheduled by PDCCH with repetition may be similar to that of Release 15 in which only $d_{1,1}$ is different, where the number of overlapping symbols between ePDCCH and PDSCH may be used.

For example, the ePDCCH may comprise a first PDCCH and a second PDCCH. For the number of overlapping symbols between ePDCCH and PDSCH, it depends on both the number of overlapping symbols between the first PDCCH and PDSCH (denoted as 'x') and the number of overlapping symbols between the second PDCCH and PDSCH (denoted as 'y').

Figure 4A:
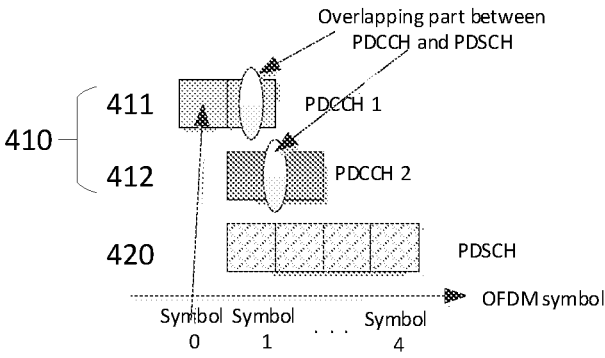
FIG. 4A is a schematic diagram illustrating an example of time partial overlapping between linked PDCCHs with scheduling restriction in accordance with some implementations of the present disclosure.
Figure 4B:
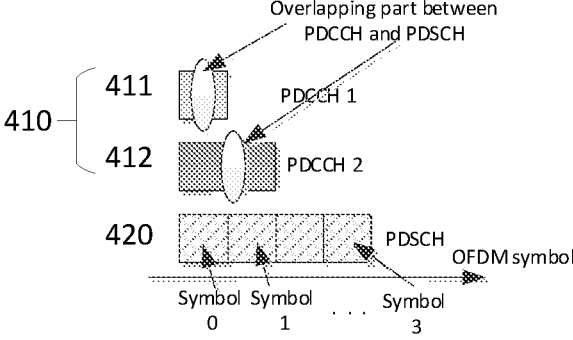
FIG. 4B is a schematic diagram illustrating another example of time partial overlapping between linked PDCCHs with scheduling restriction in accordance with some implementations of the present disclosure.
Figure 4C:
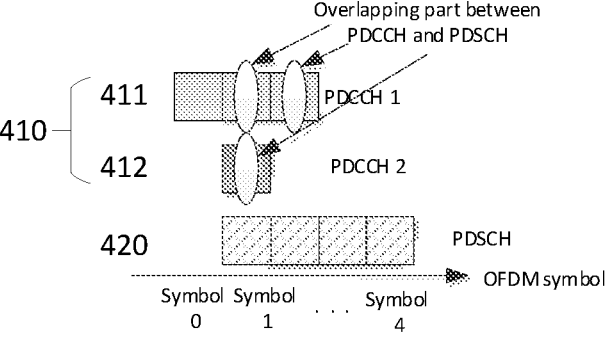
FIG. 4C is a schematic diagram illustrating a further example of time partial overlapping between linked PDCCHs with scheduling restriction in accordance with some implementations of the present disclosure.

FIGS. 4A to 4C show three examples of time partial overlapping between linked PDCCHs with scheduling restriction in accordance with some implementations of the present disclosure. In FIGS. 4A to 4C, PDCCH 1 411 (i.e., the first PDCCH) and PDCCH 2 412 (i.e., the second PDCCH) are linked PDCCHs 410 with repetition, or ePDCCH, and PDSCH 420 is scheduled by PDCCH 1 411 and PDCCH 2 412 together. There is overlapping between PDCCH 1 411 and PDSCH 420 in the time domain and there is overlapping between PDCCH 2 412 and PDSCH 420 in the time domain.

In FIG. 4A, the overlapping symbols are symbol {1} between PDCCH 1 411 and PDSCH 420, and symbols {1, 2} between PDCCH 2 412 and PDSCH 420. Thus, x=1, y=2. PDCCH 2 412 starts with later symbol (i.e., starts later) than PDCCH 1 411.

In FIG. 4B, the overlapping symbols are symbol {0} between PDCCH 1 411 and PDSCH 420, and symbols {0, 1} between PDCCH 2 412 and PDSCH 420. Thus, x=1, y=2. The starting symbol for PDCCH 1 411 and PDCCH 2 412 is the same, i.e., symbol {0}.

In FIG. 4C, the overlapping symbols are symbols {1, 2} between PDCCH 1 411 and PDSCH 420, and symbol {1} between PDCCH 2 412 and PDSCH 420. Thus, x=2, y=1. PDCCH 2 412 starts with a later symbol than PDCCH 1 411, i.e., PDCCH 2 412 starts later than PDCCH 1 411.

There are two numbers of overlapping symbols in the case of PDSCH scheduled by multiple PDCCHs with repetition (i.e., ePDCCH). Thus, the number of overlapping symbols between ePDCCH and PDSCH which is used to determine $d_{1,1}$ needs to be defined.

For various overlapping cases between ePDCCH and PDSCH (e.g., examples shown in FIGS. 4A to 4C), three kinds of enhanced schemes for defining the overlapping symbol number are proposed to determine $d_{1,1}$.

Scheme 1: The number of overlapping symbols for determining $d_{1,1}$ is defined as max {x, y}.

Since UE needs receiving both PDCCHs before performing PDCCH decoding, the overlapping symbols corresponding to the first PDCCH and the PDSCH and the overlapping symbols corresponding to the second PDCCH and the PDSCH may be used together to define the overlapping symbol for ePDCCH. For this definition, it is proposed based on the basic scheduling restriction that the UE does not expect that the first symbol of the PDCCH scheduling the PDSCH is received in a symbol later than the first symbol indicated in the PDSCH time domain resource allocation.

Accordingly, for ePDCCH, the PDCCH scheduling the PDSCH is assumed, in principle, as the one of the linked PDCCHs that starts later in time. This scheme may be used for scheduling case with this restriction. Thus, the overlapping symbol number between ePDCCH and PDSCH may be denoted as max {x, y}. In the examples shown in FIGS. 4A to 4C, the proposed overlapping symbol number for determining $d_{1,1}$ is 2 since max {x, y} is 2 for all the three examples.

This scheme may also be used for pure TDM based ePDCCH where there is no time overlapping between the first PDCCH and the second PDCCH with repetition. In such case, the overlapping symbol number between the PDCCH starting earlier and the PDSCH will be 0 based on the scheduling restriction mentioned in the previous paragraph. Thus, the overlapping symbol number is equivalent to the number of overlapping symbols between the PDCCH starting later and the PDSCH.

In this scheme, a larger one of the number of overlapping symbols between the first PDCCH and the PDSCH and the number of overlapping symbols between the second PDCCH and the PDSCH is used to determine $d_{1,1}$, which is used to determine the PDSCH processing procedure time.

Scheme 2: The overlapping symbol number for determining $d_{1,1}$ is defined as the number of overlapping symbols between the PDCCH starting later and the scheduled PDSCH but with restriction that the number of overlapping symbols between PDCCH starting later and the scheduled PDSCH is no smaller than the number of overlapping symbols between the PDCCH starting earlier and the scheduled PDSCH.

For pure TDM case, it is a good scheme that the number of overlapping symbols for determining $d_{1,1}$ is defined as the number of overlapping symbols between the PDCCH starting later and the PDSCH when the PDCCH candidate starting later in time serves as the reference for defining the earliest time for PDSCH scheduling and SLIV definition with configuration with ReferenceofSLIV-ForDCIFormat1_2. As a unified solution for both TDM and FDM with partial overlapping in the time domain, the number of overlapping symbols for determining $d_{1,1}$ may be defined based on the number of overlapping symbols between the PDCCH starting later and the PDSCH but the restriction is introduced to guarantee it equals to max {x, y}. Accordingly, the restriction is that the number of overlapping symbols between the PDCCH starting later and the scheduled PDSCH is no smaller than (or equal to) the number of overlapping symbols between the PDCCH starting earlier and the scheduled PDSCH. However, this scheme does not support some configurations, e.g., the example shown in FIG. 4C with this restriction.

For the case with partial time overlapping FDM based ePDCCH transmission, e.g., the example shown in FIG. 4B, the starting symbol may be same for both PDCCHs with repetition. There is ambiguity for the definition of reference PDCCH/candidate since it is defined based on the starting symbols of two PDCCHs. Thus, it may be defined that the PDCCH/candidate ending later in time may serve as the reference PDCCH/candidate when the starting symbols for both the PDCCHs/candidates are the same. With the mentioned definition in this scheme, it may well match overlapping symbols between PDCCH and PDSCH, and thus this reference PDCCH/candidate may be used for determining $d_{1,1}$.

Scheme 3: The number of overlapping symbols for determining $d_{1,1}$ is defined as x+y−z, where z is the overlapping symbol number between symbol set 1 and symbol set 2; and symbol set 1 includes overlapping symbols between the first PDCCH and PDSCH, and symbol set 2 includes overlapping symbols between the second PDCCH and PDSCH. In some examples, the number of overlapping symbols between ePDCCH and PDSCH may be referred to as the effective number of overlapping symbols.

This scheme gives a general definition of the number of overlapping symbols between ePDCCH and PDSCH although it is relatively complex compared to schemes 1 and 2. If there is scheduling restriction that UE is not expected that the first symbol of the PDCCH scheduling the PDSCH is received in a symbol later than the first symbol indicated in the PDSCH time domain resource allocation it is equivalent to scheme 1.

For the example shown in FIG. 4A, the overlapping symbol between PDCCH 1 411 and PDCCH 2 412 is {1}, and the number of overlapping symbols between symbol set 1 {0, 1} and symbol set 2 {1, 2} is 1. Thus, x=1, y=2, z=1, and the number of overlapping symbols for determining $d_{1,1}$ is 2.

For the example shown in FIG. 4B, the overlapping symbol between PDCCH 1 411 and PDCCH 2 412 is {0}, and the number of overlapping symbols between symbol set 1 {0} and symbol set 2 {0, 1} is 1. Thus, x=1, y=2, z=1, and the number of overlapping symbols for determining $d_{1,1}$ is 2.

For the example shown in FIG. 4C, the overlapping symbol between PDCCH 1 411 and PDCCH 2 412 is {1}, and the number of overlapping symbols between symbol set 1 {0, 1, 2} and symbol set 2 {1} is 1. Thus, x=2, y=1, z=1, and the number of overlapping symbols for determining $d_{1,1}$ is 2.

If there is no restriction for scheduling, scheme 3 will be more accurate relative to scheme 1.

Figure 5A:
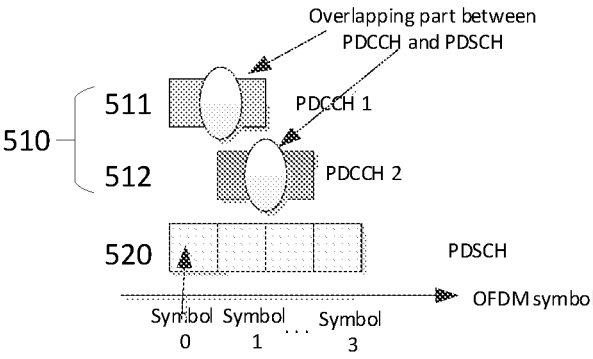
FIG. 5A is a schematic diagram illustrating an example of scheduling case without scheduling restriction in accordance with some implementations of the present disclosure.
Figure 5B:
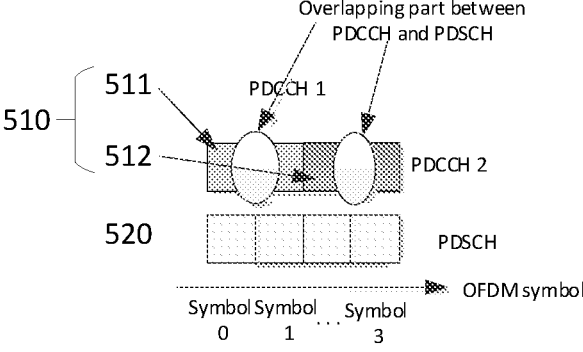
FIG. 5B is a schematic diagram illustrating another example of scheduling case without scheduling restriction in accordance with some implementations of the present disclosure.
Figure 5C:
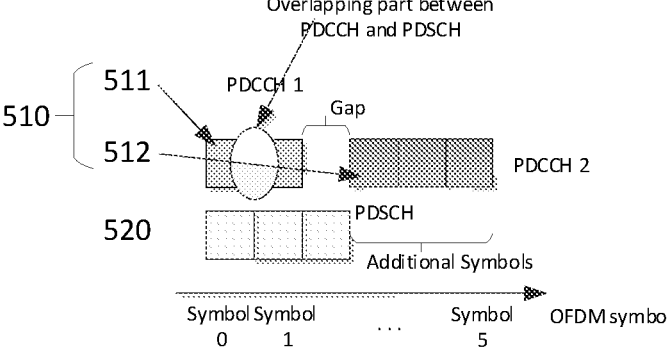
FIG. 5C is a schematic diagram illustrating a further example of scheduling case without scheduling restriction in accordance with some implementations of the present disclosure.

FIG. 5A to FIG. 5C show examples of scheduling case without scheduling restriction in accordance with some implementations of the present disclosure. The ePDCCH 510 includes a first PDCCH 511 and a second PDCCH 512.

For the example shown in FIG. 5A, the overlapping symbols are symbol {0, 1} between PDCCH 1 511 and PDSCH 520, and symbols {1, 2} between PDCCH 2 512 and PDSCH 520; and the overlapping symbol between PDCCH 1 511 and PDCCH 2 512 is {1}. Thus, x=2, y=2, z=1, and the effective number of overlapping symbols for determining $d_{1,1}$ is 3 for scheme 3, which would be 2 for scheme 1.

For the example shown in FIG. 5B, the overlapping symbols are symbol {0, 1} between PDCCH 1 511 and PDSCH 520, and symbols {2, 3} between PDCCH 2 512 and PDSCH 520; and there is no overlapping between PDCCH 1 511 and PDCCH 2 512. Thus, x=2, y=2, z=0, and the effective number of overlapping symbols for determining $d_{1,1}$ is 4 for scheme 3, which would be 2 for scheme 1.

For the examples shown in FIGS. 5A and 5B, scheme 3 may be more reasonable for defining the effective number of overlapping symbols to determine $d_{1,1}$ from the view of meeting processing time requirement.

In the example shown in FIG. 5C, PDCCH 1 511 ends earlier than a start of PDCCH 2 512 and there is a gap between PDCCH 1 511 and PDCCH 2 5112 in the time domain. The effective number of overlapping symbols for determining $d_{1,1}$ may further include the number of symbols in the gap, which is 1 in this example.

Further, PDCCH 2 512 in FIG. 5C ends no earlier than PDCCH 1 511, and later than the PDSCH 520. In this example, there are three additional symbols between the end of PDSCH 520 and the end of PDCCH 2 512. The effective number of overlapping symbols for determining $d_{1,1}$ may further include the number of symbols between the end of PDCCH 2 512 and the end of the PDSCH 520. Accordingly, the effective number of overlapping symbols for determining $d_{1,1}$ in the example of FIG. 5C may be derived as 6, that is 2+1+3. When there is no gap for partial time overlapping case, it can be thought as OFDM symbol for gap equals to 0. Then, the effective number of overlapping symbols for determining $d_{1,1}$ may include the number of symbols between the end of PDCCH 2 512 and the end of the PDSCH 520 as another embodiment.

PDSCH Processing Procedure Time with Increasing ePDCCH Processing Time

For blind detection, additional complexity can be introduced by additional LLR combination and increased candidate number for candidate pair, e.g., 3 based on UE capability reporting. For non-overlapping CCE, it can be increased on account of configuration with multiple CORESETs and search space sets. Therefore, ePDCCH processing time may be increased to certain extent if there is no restriction.

Figure 6:
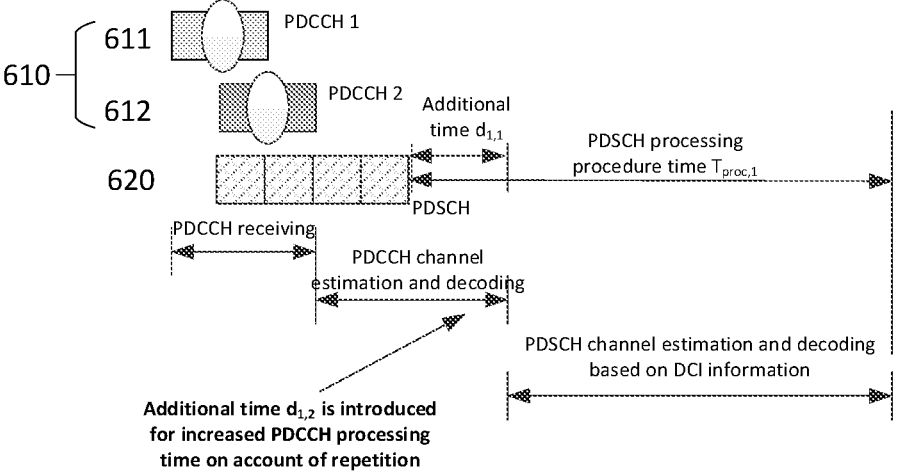
FIG. 6 is a schematic diagram illustrating an example of PDSCH processing procedure time with additional processing time for ePDCCH in accordance with some implementations of the present disclosure.

With the increase in the ePDCCH processing time, the PDSCH processing procedure time may be increased since ePDCCH processing time is a part of PDSCH processing procedure time. FIG. 6 is a schematic diagram illustrating an example of PDSCH processing procedure time with additional processing time for ePDCCH in accordance with some implementations of the present disclosure.

As shown in FIG. 6, PDCCH 1 611 (i.e., the first PDCCH) and PDCCH 2 612 (i.e., the second PDCCH) are linked PDCCHs 610 with repetition, or ePDCCH, and PDSCH 620 is scheduled by PDCCH 1 611 and PDCCH 2 612 together. There is overlapping between PDCCH 1 611 and PDSCH 620 in the time domain, and there is overlapping between PDCCH 2 612 and PDSCH 620 in the time domain In a first scheme, an additional time $d_{1,2}$ may be introduced in PDSCH processing procedure time $T_{proc,1}$. The additional time $d_{1,2}$ is introduced for PDCCH channel estimation and decoding. It may be derived by specific symbol number based on UE capability reporting. In some examples, one specific value of additional time may be implicitly linked with one value from UE capability reporting on required number of blind detection for two PDCCH candidates since it is agreed that UE reports 2 or 3 as the required number of BD for the two PDCCH candidates. For example, when UE reports "2", p symbols are used as the additional time $d_{1,2}$; when UE reports "3", q symbols are used as the additional time $d_{1,2}$; and when UE does not report this capability, there is no need for additional time $d_{1,2}$, where p, q can be fixed values according to various UE process capability.

In a second scheme, since blind detection for PDCCH can be made during receiving PDSCH or time gap between PDCCH and PDSCH, the impact of ePDCCH processing time on PDSCH processing procedure time mainly lies on the case with small scheduled PDSCH symbol length. Thus, it may be added in $d_{1,1}$ as an additional item for increasing PDSCH processing procedure time. The additional time for increasing PDSCH processing procedure time may be obtained by UE reported specific symbol number based on UE capability reporting or implicitly derived value based on linkage between specified value and UE capability reporting on required number of blind detection for two PDCCH candidates as introduced in the first scheme. For this kind of schemes, the additional time for ePDCCH processing is only introduced when the value of $d_{1,1}$ is non-zero. In other words, it will be used for cases with small PDSCH scheduling symbol length.

The above schemes may be used in addition to the three schemes proposed with the assumption that there is no increase in the ePDCCH processing time.

In some examples, the additional time $d_{1,2}$ may be implicitly reflected by modifying the definition of overlapping symbol number for $d_{1,1}$. For example, the overlapping symbol number for determining $d_{1,1}$ may be defined as x+y, where definition of (x, y) is the same as that mentioned earlier.

With independent consideration of the overlapping symbols between the first PDCCH and PDSCH and the overlapping symbols between the second PDCCH and PDSCH, the time corresponding to $d_{1,1}$ is increased relative to scheme 1 as discussed earlier, where the increased time may be used for ePDCCH decoding with high complexity.

In some other examples, this scheme may be used as an independent scheme, substituting the three schemes proposed with the assumption that there is no increase in the ePDCCH processing time.

Figure 7:
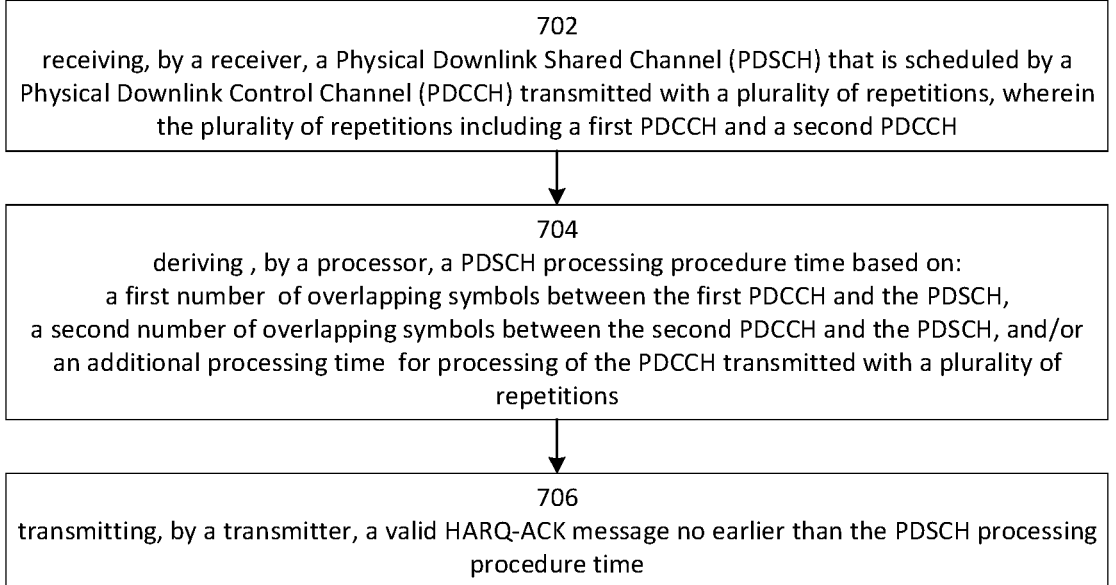
FIG. 7 is a flow chart illustrating steps of PDSCH processing procedure time derivation for HARQ-ACK feedback of PDSCH scheduled by enhanced PDCCH by UE in accordance with some implementations of the present disclosure.

FIG. 7 is a flow chart illustrating steps of PDSCH processing procedure time derivation for HARQ-ACK feedback of PDSCH scheduled by enhanced PDCCH by UE 200 in accordance with some implementations of the present disclosure.

At step 702, the receiver 214 of UE 200 receives a Physical Downlink Shared Channel (PDSCH) that is scheduled by a Physical Downlink Control Channel (PDCCH) transmitted with a plurality of repetitions, wherein the plurality of repetitions including a first PDCCH and a second PDCCH.

At step 704, the processor 202 of UE 200 derives a PDSCH processing procedure time based on: a first number of overlapping symbols between the first PDCCH and the PDSCH, a second number of overlapping symbols between the second PDCCH and the PDSCH, and/or an additional processing time for processing of the PDCCH transmitted with a plurality of repetitions.

At step 706, the transmitter 212 of UE 200 transmits a valid Hybrid Automatic Repeat Request Acknowledgement (HARQ-ACK) message no earlier than the PDSCH processing procedure time.

FIG. 8 is a flow chart illustrating steps of PDSCH processing procedure time derivation for HARQ-ACK feedback of PDSCH scheduled by enhanced PDCCH by gNB or NE 300 in accordance with some implementations of the present disclosure.

At step 802, the transmitter 312 of NE 300 transmits a Physical Downlink Control Channel (PDCCH) with a plurality of repetitions and a Physical Downlink Shared Channel (PDSCH) that is scheduled by the PDCCH with the plurality of repetitions, wherein the plurality of repetitions including a first PDCCH and a second PDCCH.

At step 804, the processor 302 of NE 300 derives a PDSCH processing procedure time based on: a first number of overlapping symbols between the first PDCCH and the PDSCH, a second number of overlapping symbols between the second PDCCH and the PDSCH, and/or an additional processing time for processing of the PDCCH transmitted with a plurality of repetitions.

At step 806, the receiver 314 of NE 300 receives a valid Hybrid Automatic Repeat Request Acknowledgement (HARQ-ACK) message no earlier than the PDSCH processing procedure time.

In one aspect, some items as examples of the disclosure concerning a method of a UE or remote device may be summarized as follows:

1. A method, comprising:

receiving, by a receiver, a Physical Downlink Shared Channel (PDSCH) that is scheduled by a Physical Downlink Control Channel (PDCCH) transmitted with a plurality of repetitions, wherein the plurality of repetitions including a first PDCCH and a second PDCCH;

deriving, by a processor, a PDSCH processing procedure time based on:

a first number of overlapping symbols between the first PDCCH and the PDSCH, a second number of overlapping symbols between the second PDCCH and the PDSCH, and/or an additional processing time for processing of the PDCCH transmitted with a plurality of repetitions; and transmitting, by a transmitter, a valid Hybrid Automatic Repeat Request Acknowledgement (HARQ-ACK) message no earlier than the PDSCH processing procedure time.

2. The method of item 1, wherein the PDSCH processing procedure time is derived based on a larger one of the first number of overlapping symbols and the second number of overlapping symbols.

3. The method of item 1, wherein the second PDCCH starts later than the first PDCCH; the PDSCH processing procedure time is derived based on the second number of overlapping symbols; and the second number of overlapping symbols is no smaller than the first number of overlapping symbols.

4. The method of item 1, wherein the first and second PDCCHs start from a same symbol, and the second PDCCH ends later than the first PDCCH; and the PDSCH processing procedure time is derived based on the second number of overlapping symbols.

5. The method of item 1, wherein the PDSCH processing procedure time is derived based on an effective number of overlapping symbols of a first set symbols and a second set of symbols; the first set of symbols comprising overlapping symbols between the first PDCCH and the PDSCH; and the second set of symbols comprising overlapping symbols between the second PDCCH and the PDSCH.

6. The method of item 5, wherein the effective number of overlapping symbols is derived from the first number of overlapping symbols, the second number of overlapping symbols, and a third number of overlapping symbols between the first set of symbols and the second set of symbols.

7. The method of item 5, wherein the second PDCCH ends no earlier than the first PDCCH and later than the PDSCH, and the effective number of overlapping symbols is derived further from a fourth number of symbols between an end of the second PDCCH and an end of the PDSCH.

8. The method of item 1, wherein the additional processing time is explicitly obtained from a specific symbol number of UE capability reporting.

9. The method of item 1, wherein the additional processing time is implicitly derived from UE capability reporting for required number of blind detections for the first and second PDCCHs.

10. The method of item 9, wherein a one-to-one mapping is defined between the additional processing time and the required number of blind detections.

11. The method of item 1, wherein the PDSCH processing procedure time is derived based on a sum of the first number of overlapping symbols and the second number of overlapping symbols.

12. The method of any one of items 1 to 11, wherein the first PDCCH ends earlier than a start of the second PDCCH, thereby forming a gap between the first and second PDCCHs; and the PDSCH processing procedure time is derived further based on a fifth number of symbols in the gap between the first and second PDCCHs.

In another aspect, some items as examples of the disclosure concerning a method of a NE or gNB may be summarized as follows:

13. A method, comprising:

transmitting, by a transmitter, a Physical Downlink Control Channel (PDCCH)

with a plurality of repetitions and a Physical Downlink Shared Channel (PDSCH) that is scheduled by the PDCCH with the plurality of repetitions, wherein the plurality of repetitions including a first PDCCH and a second PDCCH;

deriving, by a processor, a PDSCH processing procedure time based on:

a first number of overlapping symbols between the first PDCCH and the PDSCH, a second number of overlapping symbols between the second PDCCH and the PDSCH, and/or an additional processing time for processing of the PDCCH transmitted with a plurality of repetitions; and receiving, by a receiver, a valid Hybrid Automatic Repeat Request Acknowledgement (HARQ-ACK) message no earlier than the PDSCH processing procedure time.

14. The method of item 13, wherein the PDSCH processing procedure time is derived based on a larger one of the first number of overlapping symbols and the second number of overlapping symbols.

15. The method of item 13, wherein the second PDCCH starts later than the first PDCCH; the PDSCH processing procedure time is derived based on the second number of overlapping symbols; and the second number of overlapping symbols is no smaller than the first number of overlapping symbols.

16. The method of item 13, wherein the first and second PDCCHs start from a same symbol, and the second PDCCH ends later than the first PDCCH; and the PDSCH processing procedure time is derived based on the second number of overlapping symbols.

17. The method of item 13, wherein the PDSCH processing procedure time is derived based on an effective number of overlapping symbols of a first set symbols and a second set of symbols; the first set of symbols comprising overlapping symbols between the first PDCCH and the PDSCH; and the second set of symbols comprising overlapping symbols between the second PDCCH and the PDSCH.

18. The method of item 17, wherein the effective number of overlapping symbols is derived from the first number of overlapping symbols, the second number of overlapping symbols, and a third number of overlapping symbols between the first set of symbols and the second set of symbols.

19. The method of item 17, wherein the second PDCCH ends no earlier than the first PDCCH and later than the PDSCH, and the effective number of overlapping symbols is derived further from a fourth number of symbols between an end of the second PDCCH and an end of the PDSCH.

20. The method of item 13, wherein the additional processing time is explicitly obtained from a specific symbol number of UE capability reporting.

21. The method of item 13, wherein the additional processing time is implicitly derived from UE capability reporting for required number of blind detections for the first and second PDCCHs.

22. The method of item 21, wherein a one-to-one mapping is defined between the additional processing time and the required number of blind detections.

23. The method of item 13, wherein the PDSCH processing procedure time is derived based on a sum of the first number of overlapping symbols and the second number of overlapping symbols.

24. The method of any one of items 13 to 23, wherein the first PDCCH ends earlier than a start of the second PDCCH, thereby forming a gap between the first and second PDCCHs; and the PDSCH processing procedure time is derived further based on a fifth number of symbols in the gap between the first and second PDCCHs.

In a further aspect, some items as examples of the disclosure concerning a UE or remote device may be summarized as follows:

25. An apparatus, comprising:

a receiver that receives a Physical Downlink Shared Channel (PDSCH) that is scheduled by a Physical Downlink Control Channel (PDCCH) transmitted with a plurality of repetitions, wherein the plurality of repetitions including a first PDCCH and a second PDCCH;

a processor that derives a PDSCH processing procedure time based on:

a first number of overlapping symbols between the first PDCCH and the PDSCH, a second number of overlapping symbols between the second PDCCH and the PDSCH, and/or an additional processing time for processing of the PDCCH transmitted with a plurality of repetitions; and a transmitter that transmits a valid Hybrid Automatic Repeat Request Acknowledgement (HARQ-ACK) message no earlier than the PDSCH processing procedure time.

26. The apparatus of item 25, wherein the PDSCH processing procedure time is derived based on a larger one of the first number of overlapping symbols and the second number of overlapping symbols.

27. The apparatus of item 25, wherein the second PDCCH starts later than the first PDCCH; the PDSCH processing procedure time is derived based on the second number of overlapping symbols; and the second number of overlapping symbols is no smaller than the first number of overlapping symbols.

28. The apparatus of item 25, wherein the first and second PDCCHs start from a same symbol, and the second PDCCH ends later than the first PDCCH; and the PDSCH processing procedure time is derived based on the second number of overlapping symbols.

29. The apparatus of item 25, wherein the PDSCH processing procedure time is derived based on an effective number of overlapping symbols of a first set symbols and a second set of symbols; the first set of symbols comprising overlapping symbols between the first PDCCH and the PDSCH; and the second set of symbols comprising overlapping symbols between the second PDCCH and the PDSCH.

30. The apparatus of item 29, wherein the effective number of overlapping symbols is derived from the first number of overlapping symbols, the second number of overlapping symbols, and a third number of overlapping symbols between the first set of symbols and the second set of symbols.

31. The apparatus of item 29, wherein the second PDCCH ends no earlier than the first PDCCH and later than the PDSCH, and the effective number of overlapping symbols is derived further from a fourth number of symbols between an end of the second PDCCH and an end of the PDSCH.

32. The apparatus of item 25, wherein the additional processing time is explicitly obtained from a specific symbol number of UE capability reporting.
33. The apparatus of item 25, wherein the additional processing time is implicitly derived from UE capability reporting for required number of blind detections for the first and second PDCCHs.
34. The apparatus of item 33, wherein a one-to-one mapping is defined between the additional processing time and the required number of blind detections.
35. The apparatus of item 25, wherein the PDSCH processing procedure time is derived based on a sum of the first number of overlapping symbols and the second number of overlapping symbols.
36. The apparatus of any one of items 25 to 35, wherein the first PDCCH ends earlier than a start of the second PDCCH, thereby forming a gap between the first and second PDCCHs; and the PDSCH processing procedure time is derived further based on a fifth number of symbols in the gap between the first and second PDCCHs.

In a yet further aspect, some items as examples of the disclosure concerning a NE or gNB may be summarized as follows:

37. An apparatus, comprising:
a transmitter that transmits a Physical Downlink Control Channel (PDCCH) with a plurality of repetitions and a Physical Downlink Shared Channel (PDSCH) that is scheduled by the PDCCH with the plurality of repetitions, wherein the plurality of repetitions including a first PDCCH and a second PDCCH;
a processor that derives a PDSCH processing procedure time based on:
a first number of overlapping symbols between the first PDCCH and the PDSCH,
a second number of overlapping symbols between the second PDCCH and the PDSCH, and/or
an additional processing time for processing of the PDCCH transmitted with a plurality of repetitions; and
a receiver that receives a valid Hybrid Automatic Repeat Request Acknowledgement (HARQ-ACK) message no earlier than the PDSCH processing procedure time.
38. The apparatus of item 37, wherein the PDSCH processing procedure time is derived based on a larger one of the first number of overlapping symbols and the second number of overlapping symbols.
39. The apparatus of item 37, wherein the second PDCCH starts later than the first PDCCH; the PDSCH processing procedure time is derived based on the second number of overlapping symbols; and the second number of overlapping symbols is no smaller than the first number of overlapping symbols.
40. The apparatus of item 37, wherein the first and second PDCCHs start from a same symbol, and the second PDCCH ends later than the first PDCCH; and the PDSCH processing procedure time is derived based on the second number of overlapping symbols.
41. The apparatus of item 37, wherein the PDSCH processing procedure time is derived based on an effective number of overlapping symbols of a first set symbols and a second set of symbols; the first set of symbols comprising overlapping symbols between the first PDCCH and the PDSCH; and the second set of symbols comprising overlapping symbols between the second PDCCH and the PDSCH.
42. The apparatus of item 41, wherein the effective number of overlapping symbols is derived from the first number of overlapping symbols, the second number of overlapping symbols, and a third number of overlapping symbols between the first set of symbols and the second set of symbols.
43. The apparatus of item 41, wherein the second PDCCH ends no earlier than the first PDCCH and later than the PDSCH, and the effective number of overlapping symbols is derived further from a fourth number of symbols between an end of the second PDCCH and an end of the PDSCH.
44. The apparatus of item 37, wherein the additional processing time is explicitly obtained from a specific symbol number of UE capability reporting.
45. The apparatus of item 37, wherein the additional processing time is implicitly derived from UE capability reporting for required number of blind detections for the first and second PDCCHs.
46. The apparatus of item 45, wherein a one-to-one mapping is defined between the additional processing time and the required number of blind detections.
47. The apparatus of item 37, wherein the PDSCH processing procedure time is derived based on a sum of the first number of overlapping symbols and the second number of overlapping symbols.
48. The apparatus of any one of items 37 to 47, wherein the first PDCCH ends earlier than a start of the second PDCCH, thereby forming a gap between the first and second PDCCHs; and the PDSCH processing procedure time is derived further based on a fifth number of symbols in the gap between the first and second PDCCHs.

Various embodiments and/or examples are disclosed to provide exemplary and explanatory information to enable a person of ordinary skill in the art to put the disclosure into practice. Features or components disclosed with reference to one embodiment or example are also applicable to all embodiments or examples unless specifically indicated otherwise.

Embodiments may be practiced in other specific forms. The described embodiments are to be considered in all respects only as illustrative and not restrictive. The scope is, therefore, indicated by the appended claims rather than by the foregoing description. All changes which come within the meaning and range of equivalency of the claims are to be embraced within their scope.

What is claimed is:
1. A method performed by a user equipment (UE), the method comprising:
receiving a physical downlink shared channel (PDSCH) that is scheduled by a physical downlink control channel (PDCCH) transmitted with a plurality of repetitions, the plurality of repetitions including a first PDCCH and a second PDCCH;
deriving a PDSCH processing procedure time based on at least one of:
a larger one of a first number of overlapping symbols between the first PDCCH and the PDSCH and a second number of overlapping symbols between the second PDCCH and the PDSCH; or
an additional processing time for processing of the PDCCH transmitted with the plurality of repetitions; and
transmitting a valid hybrid automatic repeat request acknowledgement (HARQ-ACK) message no earlier than the PDSCH processing procedure time.

2. The method of claim 1, wherein:
the second PDCCH starts later than the first PDCCH;
the PDSCH processing procedure time is derived based on the second number of overlapping symbols; and
the second number of overlapping symbols is no smaller than the first number of overlapping symbols.

3. The method of claim 1, wherein:
the first PDCCH and the second PDCCH start from a same symbol:
the second PDCCH ends later than the first PDCCH; and
the PDSCH processing procedure time is derived based on the second number of overlapping symbols.

4. A network equipment (NE) for wireless communication, comprising:
at least one memory; and
at least one processor coupled with the at least one memory and configured to cause the NE to:
transmit a physical downlink control channel (PDCCH) with a plurality of repetitions and a physical downlink shared channel (PDSCH) that is scheduled by the PDCCH with the plurality of repetitions, the plurality of repetitions including a first PDCCH and a second PDCCH;
derive a PDSCH processing procedure time based on at least one of:
a larger one of a first number of overlapping symbols between the first PDCCH and the PDSCH and a second number of overlapping symbols between the second PDCCH and the PDSCH; or
an additional processing time for processing of the PDCCH transmitted with the plurality of repetitions; and
receive a valid hybrid automatic repeat request acknowledgement (HARQ-ACK) message no earlier than the PDSCH processing procedure time.

5. The NE of claim 4, wherein:
the second PDCCH starts later than the first PDCCH;
the PDSCH processing procedure time is derived based on the second number of overlapping symbols; and
the second number of overlapping symbols is no smaller than the first number of overlapping symbols.

6. A user equipment (UE) for wireless communication, comprising:
at least one memory; and
at least one processor coupled with the at least one memory and configured to cause the UE to:
receive a physical downlink shared channel (PDSCH) that is scheduled by a physical downlink control channel (PDCCH) transmitted with a plurality of repetitions, the plurality of repetitions including a first PDCCH and a second PDCCH;
derive a PDSCH processing procedure time based on at least one of:
a larger one of a first number of overlapping symbols between the first PDCCH and the PDSCH and a second number of overlapping symbols between the second PDCCH and the PDSCH; or
an additional processing time for processing the PDCCH transmitted with the plurality of repetitions; and
transmit a valid hybrid automatic repeat request acknowledgement (HARQ-ACK) message no earlier than the PDSCH processing procedure time.

7. The UE of claim 6, wherein:
the second PDCCH starts later than the first PDCCH;
the PDSCH processing procedure time is derived based on the second number of overlapping symbols; and the second number of overlapping symbols is no smaller than the first number of overlapping symbols.

8. The UE of claim 6, wherein:
the first PDCCH and the second PDCCH start from a same symbol;
the second PDCCH ends later than the first PDCCH; and
the PDSCH processing procedure time is derived based on the second number of overlapping symbols.

9. The UE of claim 6, wherein:
the PDSCH processing procedure time is derived based on an effective number of overlapping symbols of a first set of symbols and a second set of symbols;
the first set of symbols including overlapping symbols between the first PDCCH and the PDSCH; and
the second set of symbols including overlapping symbols between the second PDCCH and the PDSCH.

10. The UE of claim 9, wherein the effective number of overlapping symbols is derived from the first number of overlapping symbols, the second number of overlapping symbols, and a third number of overlapping symbols between the first set of symbols and the second set of symbols.

11. The UE of claim 10, wherein the second PDCCH ends no earlier than the first PDCCH and later than the PDSCH, and the effective number of overlapping symbols is further derived from a fourth number of symbols between an end of the second PDCCH and an end of the PDSCH.

12. The UE of claim 6, wherein the additional processing time is explicitly obtained from a specific symbol number of UE capability reporting.

13. The UE of claim 6, wherein the additional processing time is implicitly derived from UE capability reporting for a required number of blind detections for the first PDCCH and the second PDCCH.

14. The UE of claim 13, wherein a one-to-one mapping is defined between the additional processing time and the required number of blind detections.

15. The UE of claim 6, wherein the PDSCH processing procedure time is derived based on a sum of the first number of overlapping symbols and the second number of overlapping symbols.

16. The UE of claim 6, wherein:
the first PDCCH ends earlier than a start of the second PDCCH, thereby forming a gap between the first PDCCH and the second PDCCH; and
the PDSCH processing procedure time is derived further based on a third number of symbols in the gap between the first PDCCH and the second PDCCH.

17. A processor for wireless communication, comprising:
at least one controller coupled with at least one memory and configured to cause the processor to:
receive a physical downlink shared channel (PDSCH) that is scheduled by a physical downlink control channel (PDCCH) transmitted with a plurality of repetitions, the plurality of repetitions including a first PDCCH and a second PDCCH;
derive a PDSCH processing procedure time based on at least one of:
a larger one of a first number of overlapping symbols between the first PDCCH and the PDSCH and a second number of overlapping symbols between the second PDCCH and the PDSCH; or
an additional processing time for processing the PDCCH transmitted with the plurality of repetitions; and transmit a valid hybrid automatic repeat request acknowledgement (HARQ-ACK) message no earlier than the PDSCH processing procedure time.

18. The processor of claim 17, wherein:

the second PDCCH starts later than the first PDCCH;

the PDSCH processing procedure time is derived based on the second number of overlapping symbols; and the second number of overlapping symbols is no smaller than the first number of overlapping symbols.

19. The processor of claim 17, wherein:

the first PDCCH and the second PDCCH start from a same symbol:

the second PDCCH ends later than the first PDCCH; and the PDSCH processing procedure time is derived based on the second number of overlapping symbols.

20. The processor of claim 17, wherein:

the PDSCH processing procedure time is derived based on an effective number of overlapping symbols of a first set of symbols and a second set of symbols;

the first set of symbols including overlapping symbols between the first PDCCH and the PDSCH; and the second set of symbols including overlapping symbols between the second PDCCH and the PDSCH.

\* \* \* \* \*